United States Patent [19]

Pirlet

[11] Patent Number: 4,541,723
[45] Date of Patent: Sep. 17, 1985

[54] MONITORING THE PLANARITY OF METAL SHEET

[75] Inventor: Robert A. Pirlet, Embourg, Belgium

[73] Assignee: Centre de Recherches Metallurgiques-Centrum Voor Research in de Metallurgie, Brussels, Belgium

[21] Appl. No.: 563,261

[22] Filed: Dec. 20, 1983

Related U.S. Application Data

[63] Continuation of Ser. No. 272,910, Jun. 12, 1981, abandoned.

[30] Foreign Application Priority Data

Jun. 13, 1980 [BE] Belgium ................................ 883832

[51] Int. Cl.[4] .............................................. G01B 11/24
[52] U.S. Cl. ........................................ 356/376; 356/1
[58] Field of Search ................... 356/1, 376, 381, 429, 356/431

[56] References Cited

U.S. PATENT DOCUMENTS 3,187,185  6/1965  Milnes ................................. 356/381
3,565,531  2/1971  Kane .................................... 356/381
3,573,849  4/1971  Herriot ................................ 350/6.8
3,610,754  10/1971 Pirlet ..................................... 356/1
3,671,726  6/1972  Kerr ..................................... 356/381
4,198,164  4/1980  Cantor ................................ 356/375

OTHER PUBLICATIONS

Pirlet et al., "CRM Develops Laser-Based Hot Strip Flatness Gauge", *Iron and Steel International*, vol. 51, No. 4, (Aug. 1978), pp. 215-216, 219-221.

Primary Examiner—R. A. Rosenberger
Attorney, Agent, or Firm—Holman & Stern

[57] ABSTRACT

Optical beams from lasers are directed towards the middle and edges of a hot rolled steel sheet by fixed mirrors and rotatable mirrors which allow for different sheet widths. The points of incidence of the beams are observed by photodiode cameras whose receiving axes are orientated by fixed mirrors and rotatable mirrors so that the points remain in the respective fields of observation of the cameras. The levels of the points are obtained by triangulation and are used in the calculation of the planarity of the sheet.

18 Claims, 1 Drawing Figure

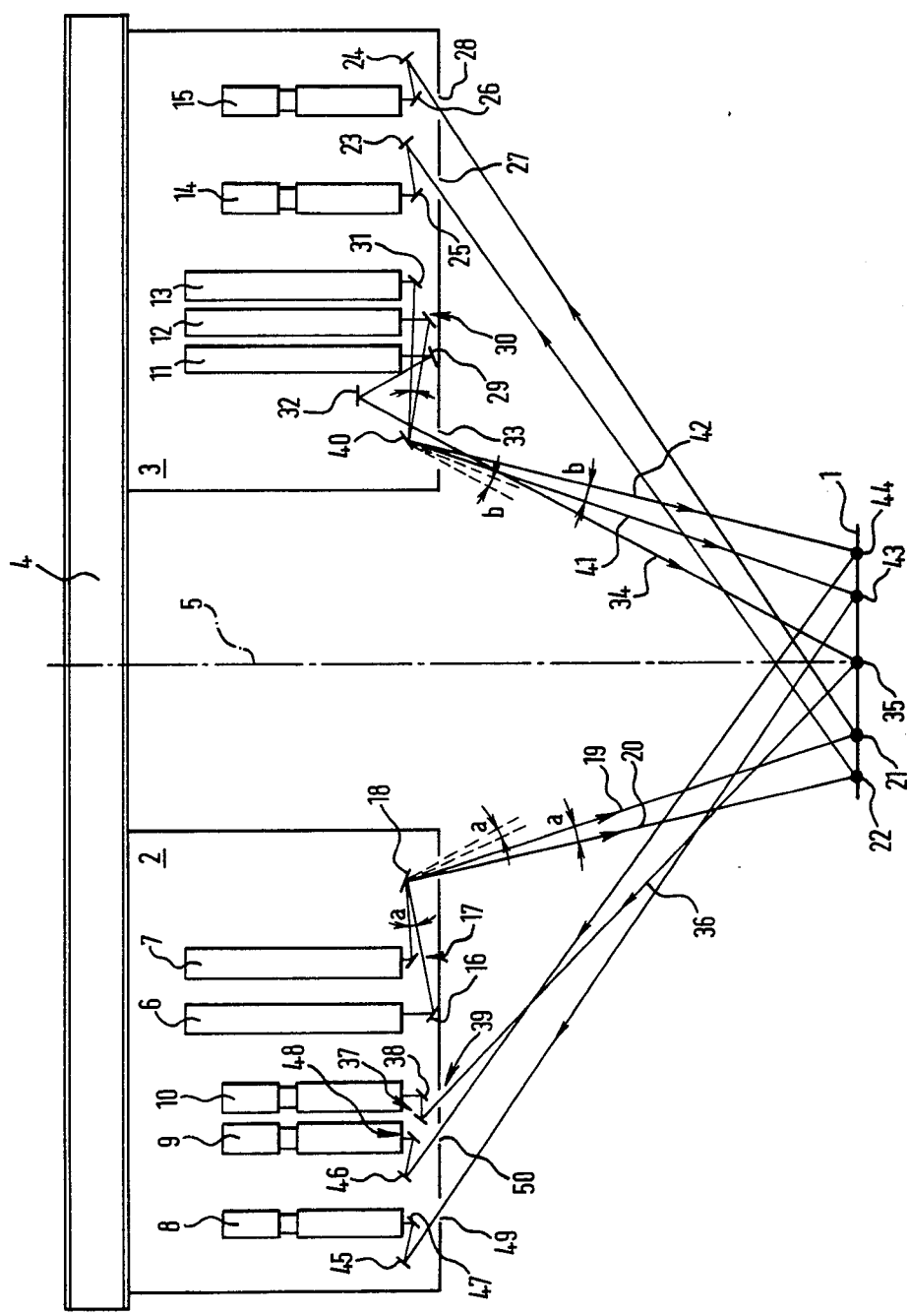

MONITORING THE PLANARITY OF METAL SHEET

This is a continuation of application Ser. No. 272,910, filed June 12, 1981, now abandoned.

CROSS REFERENCE TO RELATED APPLICATION

The invention of this application is disclosed in prior filed copending International Application No. PCT 883832, filed June 13, 1980, the benefit of which is being claimed.

BACKGROUND OF THE INVENTION

1. Field of the Invention

The present invention relates to a method and apparatus for monitoring the planarity of metal sheet, particularly advantageous in the case of steel on discharge from the rolling mill.

2. Description of the Prior Art

The applicant has already advocated a method of this type in which levels are measured with respect to a horizontal plane of reference by means of an optical triangulation. In accordance with this method, this level measurement is carried out for at least two suitably selected longitudinal regions on the surface of the product, the length of these regions is determined by associating the measurement of these levels with the speed of longitudinal displacement of the product, and the differential elongation of these regions is calculated in order to obtain a significant value for the planarity of the said surface.

In an article published in the journal *Iron and Steel International*, August 1978, p. 215–221, the applicant has described an apparatus comprising three fixed laser beams and three photodiode cameras for measurement of the level of the sheet along the middle region and along the lateral edge regions. These data are supplied to a mini-computer which calculates the planarity values, which values are then displayed on a screen enabling the operators to take the necessary steps with full information.

The results obtained in this way have proved to be very satisfactory, even in the case of very slight planarity defects, which are increasingly common nowadays with the new automatically controlled rolling mills, and it has been possible to monitor not only the quality of the rolled product but also the quality of the rolling work.

However, it is still advantageous to increase the rapidity and the accuracy of these measurements for economic reasons (prevention of rejects) as well as for reasons relating to monitoring efficiency. With the increase in rolling speeds more rapid measurements must be carried out in order to monitor the products during manufacture. In addition, if it is desired to produce long products it is advantageous to repeat the measurements as frequently as possible along the products in order to enable improved localization of the points at which a correct planarity changes to a planarity which is beyond the tolerances.

The positioning of the transmitter (lasers) and receivers (cameras) is very considerable problem which, although only arising once during the rolling of sheets of the same nominal width, arises each time the nominal width of the sheet to be rolled changes, which is the case which occurs most frequently.

In the case of the rolling of wide sheets, it is additionally advantageous to increase the number of measurement points as the area between the middle of the sheet and the edges is greater and requires a greater density of spot measurements, leading consequently to a multiplication of the apparatus components and greater problems with respect to the positioning of this apparatus.

Up to now, various positioning methods have been used, all of which have drawbacks in that they require the displacement of a large number of devices or heavy and large supports, by means which are always complicated and costly. For example, each optical circuit of a measurement triangulation is displaced, this circuit generally being of large size and very heavy.

A further drawback lies in the fact that the perpendicular spacing, which is generally low, left free between the measurement apparatus and the sheet to be monitored, leads to the risk of a collision between the apparatus and a portion of the sheet.

SUMMARY OF THE INVENTION

The present invention provides a method in which optical beams, such as for example laser beams, are transmitted in the direction of the central fibre and the edges of the sheet and possibly in the direction of other intermediate zones. A portion of the optical radiation re-transmitted by the sheet is then picked up by means of suitable receivers such as photodiode cameras. The levels of these points are calculated with respect to a horizontal plane of reference by means of optical triangulations formed by the transmitters and receivers, and a planarity index expressing the differential elongation of the scanned fibres is determined. The transmitted beams and the optical axes of the receivers are then positioned by means of deflectors which can be orientated in such a way that the points of incidence of these beams are located at the desired points of the sheet, whatever the width of this sheet.

Preferably, at least two of the transmitted optical beams are secant, their axes having a known and constant angle between each other and their point of intersection being located on the axis of rotation of the deflector. The main advantage of this embodiment lies in particular in the possibility of reducing the number of orientatable deflectors to be used.

The transmitter and receiver axes of a same triangulation are preferably coplanar. Furthermore, in general, the planes of several triangulations overlap, but it may be advantageous for them to be distinct and preferably parallel in order to prevent the same receiver from receiving the beams coming from two separate transmitters. However, two of the optical beams transmitted are advantageously perpendicular to the axis of rotation of the same orientatable deflector without being secant or parallel to one another, i.e. they are skew to one another.

The present invention also provides apparatus for carrying out the method described above, comprising two (preferably hermetically sealed) boxes located above the sheet to be monitored, these boxes being symmetrical with respect to the vertical plane at a sufficient vertical distance, preferably more than 2 meters, so as not to occupy the immediate vicinity above the sheet and in order to reduce the heat effect due to the high temperature of this sheet in the case of a hot rolling mill, these two boxes containing the transmitter and receiver apparatus as well as the orientatable positioning deflectors and these boxes comprising ports provided with transparent windows for the passage of the beams to be transmitted and received.

Preferably, the boxes themselves contain a watertight and dust-tight compartment provided with ports within which are disposed the fixed and movable deflectors, the lens, and the optical components.

BRIEF DESCRIPTION OF THE DRAWING

The invention will be described further, by way of example, with reference to the accompanying drawing, whose sole Figure is a diagrammatic representation of apparatus for monitoring the planarity of steel sheet being discharged from a hot rolling mill in a direction perpendicular to the plane of the drawing.

DETAILED DESCRIPTION OF THE INVENTION

The sheet 1 whose planarity is to be monitored has a width of 2000 mm, but may have a width ranging from 350 mm to 2000 mm, or even more. The sheet is, of course, of indefinite length.

The upper surface of two boxes 2 and 3 are fixed at a height of 3.25 m above the sheet 1 under a support beam 4 and are arranged symmetrically with respect to the vertical plane 5 (whose trace is shown in chain-dotted line) containing the longitudinal median axis of the sheet support (not shown). The horizontal distance separating these two boxes is 2.70 m (i.e. greater than the sheet width), whilst the rectangular cross-section of the boxes 2,3 in the plane of the drawing is 1.20 m × 1 m. The free space above the sheet 1 is therefore 3.25 m × 2.70 m.

The first box 2 contains two transmitters (lasers) 6 and 7 and three receivers (photodiode cameras) 8,9,10, whilst the second box 3 contains three transmitters 11,12,13 and two receivers 14,15.

The laser beams emitted by the transmitters 6 and 7 first strike respective fixed mirrors 16 and 17 and then converge on the axis of rotation of a mirror 18 rotatable about an axis perpendicular to the plane of the drawing. The beams incident on the rotatable mirror 18 form an angle a which remains constant after reflection whatever the orientation of the mirror 18, i.e. the respective reflected beams 19 and 20 also form the same angle a. These beams are intended for the measurements to be carried out on the left-hand portion of the sheet 1 between the edge and the longitudinal median axis and have points 21 and 22 of incidence on the sheet 1. A different positioning of the beams 19 and 20 as a result of different positioning of the mirror 18 about its axis is shown in broken line in the drawing. The beams 19,20 leave the box 2 through a port with a transparent window.

By means of orientatable mirrors 23 and 24 and second box fixed mirrors 25 and 26, the receivers 14 and 15 located in the second box 3 scan the left-hand portion of the sheet 1 through second box receiving ports 27 and 28 having transparent windows. In this way, the illuminated points 21 and 22 are picked up by the second receivers 14 and 15 in the box 3 (since the laser beams are diffusely reflected by the sheet). A sufficiently large angle a is selected so that the receiver 14 can never pick up the point 21 lit by the beam 19.

The laser beam emitted by the second box transmitter 11 first strikes a fixed mirror 29 and then strikes a second fixed mirror 32 which directs it through a windowed outlet port 33 of the second box 3 in the direction of the median axis of the sheet 1 as a reflected beam 34. The sheet 1 which receives the beam 34 at a point 35 on its median axis re-transmits it by diffuse reflection, including a ray 36 travelling towards the second box 2. By means of fixed mirrors 37 and 38 behind a port 39 provided with a transparent window, the receiver 10 located in the box 3 scans the point 35 lit by the incident beam 34.

Furthermore, laser beams emitted by the transmitters 12 and 13 first strike fixed mirrors 30 and 31, respectively, and then converge towards an orientatable mirror 40 rotatable about an axis perpendicular to the plane of the drawing. The beams incident on the mirror 40 form an angle b which remains constant after reflection, whatever the orientation of the mirror 40. The reflected beams 41 and 42 are intended for the measurements to be carried out on the right-hand portion of the sheet between the edge and the median axis and leave the box 3 through the same aperture 33 as the beam 34. The beams 41 and 42 illuminate points 43 and 44 on the sheet 1. A different positioning of the beams 41 and 42 resulting from different rotational positioning of the mirror 40 is shown in broken line.

The receivers 8 and 9 in the box 2 scan the right-hand portion of the sheet 1 via orientatable mirrors 45 and 46, fixed mirrors 47 and 48, and ports 49 and 50 provided with transparent windows. In this way the points 43 and 44 lit by the incident beams 41 and 42 from the box 3 are picked up by the receivers 8 and 9. A sufficiently large angle b is selected so that the receiver 8 can never pick up the point 44 lit by the beam 42. In practice, the angles a and b are identical.

It has already been noted that the transmitters may be lasers, but it is evident that other light sources may be used. Furthermore, light in the blue or ultraviolet ranges may be used in order to distinguish them from the red and infrared radiation from the high temperature sheet; suitable sources comprise mercury vapour lamps. This differentiation may be reinforced by interposing selective filters in front of the receivers.

It is also advantageous to concentrate all the optical energy provided by the source into a beam which is very fine and whose width is approximately one millimeter. The proposed laser beams have this advantage. It is obviously possible to use lenses, for example cylindrical lenses, in association with the transmitters in order to focus the beams.

With respect to the receivers, photodiode cameras are generally preferred, as this enables ready location of the measurement positions and reference positions of the optical images. It does not, however, depart from the scope of the present invention to use other types of receivers. The reference plane with respect to which the levels of the different points of the transverse section of the sheet are measured may be constituted by the horizontal plane tangential to rollers supporting the sheet.

The following is a description of a method of calculating planarity developed by the applicant, by way of example.

During selected time intervals, the levels of three illuminated points (left-hand edge region, middle region, right-hand region) on the moving sheet are measured by triangulation, using the above-described apparatus. The lengths (actual length along the undulations) of these regions and their differential elongation $\Delta L$ (with respect to a plane sheet) are calculated for these three points. The results are expressed in the form of planarity indices defined by the relationship $\Delta L/L$ wherein L is a reference length. If the values of the lengths of the right-hand edge region, the middle region, and the left-hand edge region (in the direction of displacement of the sheet) are designated by the symbols $L_1$, $L_2$, $L_3$, respectively, two planarity indices $R_o, R_o'$ are given by the following expressions:

$$R_o = \tfrac{1}{2}[(L_1 - L_2)/L_2 + (L_3 - L_2)/L_2]$$

$$R_o' = \tfrac{1}{2}[(L_1 - L_2)/L_2 - (L_3 - L_2)/L_2]$$

$$= \tfrac{1}{2}(L_1 - L_3)/L_2.$$

Of course, when there are 5 measuring points (as described above), a greater number of planarity indices can be defined.

With respect to the use of pairs of beams forming a known angle between each other, this relates to the measurements to be taken at the edges and between the middle and the edges of the sheet. As stated above, this use enables a reduction of the number of costly orientatable mirrors, but may also enable a reduction in the number of transmitters, as a single light source may be associated with optical elements in order to obtain a pair of beams of this type.

The orientatable deflectors are generally plane mirrors, but other deflectors may be used without departing from the scope of the invention. In the example described above, the orientatable deflectors are used for the transmission of 1 and 2 beams and for the reception of each beam separately, but may be used for any number of beams on transmission and reception.

The above-described apparatus is advantageous in that it provides a considerable free space above the sheet emerging from the rolling mill. The apparatus in fact comprises two boxes which are widely separate, having only mechanical and static connections with one another, as well as a mechanical and thermal protective casing. Access is therefore provided to all the devices as a result of the absence of costly doors which generally straddle the mill train. This free space also provides a gain with respect to turnings (maintenance) operations and ensures that the system is more reliable.

As clearly shown in the Figure, the beam 34, 36 from transmitter 11 to receiver 10 is reflected from the midpoint of the metal sheet being monitored, and therefore may be positionally fixed when the monitoring apparatus is symmetrically positioned as described above. The remaining beams, as shown in the Figure, may be varied by means of the rotatable mirrors 18, 40 associated with the transmitter used in conjunction with the orientatable mirrors 23, 24, 45, 46 associated with the receivers.

I claim:

1. In a method of monitoring the flatness of a substantially horizontal metal strip running longitudinally on a strip support means having a longitudinal median axis, by transmitting a plurality of optical beams emitted by a plurality of light sources, directing said optical beams toward the strip from above so that they strike the strip at a plurality of points spaced across the width of the strip, receiving the optical beams reflected from the strip on a plurality of corresponding receivers each paired with a light source, and calculating the level of said points and determining therefrom a flatness index of the strip, the improvement comprising:

locating at least two of said light sources symmetrically to each other with respect to a vertical plane containing said longitudinal median axis;

locating said receivers paired with said at least two light sources symmetrically to each other, with respect to said vertical plane containing said longitudinal median axis;

orientating the optical beams emitted by said at least two light sources in such a manner that they form an identical angle with the said vertical plane and strike the strip surface at points that are located symmetrically to each other with respect to said longitudinal median axis;

orientating the optical axes of said receivers, located symmetrically to each other with respect to said vertical plane, so that the angles formed by each of said optical axes with the axis of the optical beam emitted by the paired light source are all equal; and intercepting at least two of said optical beams from said light sources by means of a single common deflector orientatable about an axis of rotation and directing said intercepted optical beams to two points both located on the same side of the strip.

2. The method of claim 1 wherein at least one optical beam is transmitted from a light source above the first side of the strip across its notional midpoint to a designated point on the second side and said optical beam is received by a receiver located above the second side.

3. The method of claim 2 wherein two optical beams are transmitted from above each of the two sides of the strip and received by two receivers above the respective other side.

4. The method of claim 3 wherein a fixed optical beam is emitted from a light source above one side of the strip, directed to reflect from about the midpoint of the strip, and the reflected beam is received by a receiver above the other side of the strip.

5. The method of claim 1 wherein the optical beams intercepted by said deflector form a constant angle with each other and intersect each other at the axis of rotation of said deflector.

6. The method of claim 1 wherein the optical beams intercepted by said deflector are orthogonal to the axis of rotation and are skew to each other.

7. The method of claim 1 wherein the plane formed by one said optical beam and its corresponding reflected beam is separate from the plane formed by another said optical beam and its corresponding reflected beam.

8. The method of claim 7 wherein the separate planes are parallel to each other.

9. The method of claim 1 further comprising focussing and filtering said optical beams.

10. The method of claim 1 wherein said optical beams are laser beams.

11. The method of claim 1 wherein a fixed optical beam is emitted from a light source above one side of the strip, directed to reflect from about the notional midpoint of the strip, and the reflected beam is received by a receiver above the other side of the strip.

12. In an apparatus for monitoring the flatness of a substantially horizontal metal strip running longitudinally on a strip support means having a longitudinal median axis, wherein said support means defines a substantially horizontal path for the strip, said apparatus comprising transmitters arranged to produce optical beams generally directed towards the strip and receivers for receiving the optical beams reflected by the strip, the improvement comprising:

at least two transmitters located symmetrically to each other with respect to a vertical plane containing said longitudinal median axis;

receivers paired with said at least two transmitters located symmetrically to each other with respect to said vertical plane;

orientatable first deflectors arranged to intercept the optical beams for orientating the optical beams produced by said transmitters, one of said first deflectors being orientatable about an axis of rotation and arranged to intercept more than one of said optical beams produced by said transmitters; and orientatable second deflectors to direct the optical axes of said receivers for orientating the optical axes of said receivers.

13. The apparatus of claim 12 wherein said at least one first deflector is arranged so that the said intercepted optical beams form a constant angle with each other and intersect each other on said axis of rotation of said at least one first deflector.

14. The apparatus of claim 12 wherein said at least one first deflector is arranged so that the said intercepted optical beams are orthogonal to said axis of rotation and are skew to each other.

15. The apparatus of claim 12 wherein said transmitters, receivers and orientatable first and second deflectors are located inside boxes having ports through which said optical beams pass.

16. The apparatus of claim 15 wherein said boxes constitute water-tight and dust-tight enclosures and in which said ports have transparent windows.

17. The apparatus of claim 15 wherein said boxes comprise water-tight and dust-tight compartments containing said transmitters, receivers and orientatable first and second deflectors and have ports with transparent windows for the passage of said optical beams.

18. The apparatus of claim 15 wherein the bottom of said boxes is located at least two meters above said horizontal path, and in which said boxes are spaced apart, symmetrically with respect to a vertical plane containing the longitudinal median axis of said support means, by a distance greater than the width of said support means.

* * * * *